US006089980A

United States Patent [19]

Gauselmann

[11] Patent Number: 6,089,980
[45] Date of Patent: Jul. 18, 2000

[54] METHOD FOR THE DETERMINATION OF A SHARED JACKPOT WINNING

[75] Inventor: Michael Gauselmann, Wohnsitz, Germany

[73] Assignee: Atronic Casino Technology Distribution GmbH, Lubbecke, Germany

[21] Appl. No.: 08/877,534

[22] Filed: Jun. 17, 1997

[30] Foreign Application Priority Data

Jun. 18, 1996 [DE] Germany ........................... 196 24 321

[51] Int. Cl.[7] ............................... A63F 9/24; G06F 15/44

[52] U.S. Cl. ................................................ 463/27; 463/25

[58] Field of Search .................................... 463/1, 11–13, 463/9, 16, 20, 25–30, 40–42; 273/292, 293, 138.2, 143 R, 139; 340/323 R; 364/410.1, 412.1; 700/91, 93

[56] References Cited

U.S. PATENT DOCUMENTS

| | | | |
|---|---|---|---|
| 4,837,728 | 6/1989 | Barrie et al. | 463/27 |
| 4,964,638 | 10/1990 | Ishida | 463/27 |
| 5,083,271 | 1/1992 | Thacher et al. | 364/410.1 |
| 5,116,055 | 5/1992 | Tracy | 273/138 A |
| 5,393,061 | 2/1995 | Manship | 463/20 |
| 5,564,700 | 10/1996 | Celona | 463/27 |
| 5,655,961 | 8/1997 | Acres et al. | 463/42 |
| 5,664,998 | 9/1997 | Seelig et al. | 463/20 |
| 5,711,715 | 1/1998 | Ringo et al. | 273/293 |
| 5,779,549 | 7/1998 | Walker et al. | 463/42 |

*Primary Examiner*—Mark A. Sager
*Attorney, Agent, or Firm*—Horst M. Kasper

[57] ABSTRACT

A method of a shared jackpot system of a gambling apparatus unit is provided, where the gambling apparatus unit comprises a plurality of coin-operated gambling machines. The gambling machines are linked to each other and jointly fill a jackpot. A predetermined part of the gambling bet of each gambling machine is employed to fill the jackpot. The filling level of the jackpot is displayed on each gambling machine and with a large display. A communication board is coordinated to each gambling apparatus in addition to a control unit. Upon actuation of the gambling machines, it is automatically determined which one of the gambling machines assumes the control in the form of a master. The master gambling machine monitors whether a jackpot trigger value is present. In case a jackpot trigger value is present, a command sequence is sent to all linked gambling machines. At the same time there occurs a final game in the gambling machines based on the command sequence. A rank sequence and a winning quota, respectively, is determined based on the predicted game result and the actual game result, wherein the rank sequence and the winning quota, respectively, represents a distribution key for the jackpot.

20 Claims, 3 Drawing Sheets

METHOD FOR THE DETERMINATION OF A SHARED JACKPOT WINNING

BACKGROUND OF THE INVENTION

1. Field of the Invention

The invention relates to a method for the determination of a shared jackpot winning of a gambling apparatus, where the gambling apparatus comprises coin-operated gambling machines, wherein the gambling machines are interconnected and jointly fill a jackpot, and wherein a predetermined part of the gambling bet of each gambling machine is employed to fill the jackpot, and wherein the filling level of the jackpot is displayed on the gambling machine and with a large display.

2. Brief Description of the Background of the Invention Including Prior Art

An arrangement of the gambling apparatuses is known from the U.S. Pat. No. 5,116,055, where the gambling apparatuses jointly fill a jackpot. In these win-payout gambling machines, such as for example slot machines, poker machines, or bingo machines, a progressive jackpot is filled in addition as a function of the number of the coins played instead of a fixed maximum winning. This progressive jackpot is displayed to the player, on the one hand, on a large display and, on the other hand, on a numerical display on the gambling machine. The gambling machines are set and adjusted such that the jackpot is filled by a percentage of the coin value, determined and set once by the operating management of the gambling machines, of the respectively played coin value. The control of the entire jackpot system is performed according to the U.S. Pat. No. 5,116,055 with its own control unit, where the control unit is connected to each gambling machine of the jackpot system through an interface unit disposed at the respective gambling machine. The progressive jackpot is triggered in each one of the gambling machines upon reaching of a predetermined winning symbol combination or other predetermined events. A further win-triggering event can for example be the reaching of a jackpot threshold value unknown to the user of the gambling machine and accidentally obtained by the user of the gambling machine. The achieved jackpot amount can only be triggered by one gambling machine and the total amount of the jackpot is coordinated to this gambling machine or, respectively, paid out to this gambling machine. Since the symbol-representing display means of the gambling machines connected to a jackpot can be different, for example, reels, flip-card carousels, or video displays, and thus a different symbol combination variety can be displayed, it is provided that, depending on the representable combination variety of symbol combinations and on the respective gambling bet at the respective gambling machines, a different amount of the gambling bet is branched off for the jackpot filling for each gambling machine depending on the representable symbol combinations of the gambling bet. It is however a disadvantage in this context that the respective jackpot amount is coordinated only to the triggering gambling machine. Furthermore, in case of a hardware failure or a software failure of the central control unit, the total jackpot system for the jackpot will succumb to failure.

SUMMARY OF THE INVENTION

1. Purposes of the Invention

It is an object of the invention to provide a jackpot system, wherein the gambling incentive is increased, and wherein a failure of a jackpot control unit is prevented as far as possible.

It is another object of the present invention to provide a jackpot system, which can be easily set up in the field and which requires only a single type of game machine.

It is a further object of the present invention to furnish a jackpot system, which can be easily configured as a network.

It is yet another object of the present invention to furnish a jackpot system which allows to connect standard interfaces of standard personal computers for performing set up and entering desired gaming machine parameters.

It is an additional object of the present invention to furnish a jackpot system of gaming machines, which allows a plurality of gaming machines to participate simultaneously in a playout of a jackpot.

These and other objects and advantages of the present invention will become evident from the description which follows.

2. Brief Description of the Invention

The present invention furnishes a method for a determination of a shared jackpot winning of a plurality of coin-operated gambling machines. A plurality of coin-operated gambling machines are linked to each other. A distribution key for distributing a jackpot is entered into one of the plurality of coin-operated gambling machines. A token is inserted into one of the plurality of coin-operated gambling machines. A predetermined part of a gambling bet of each one of the plurality of coin-operated gambling machines is employed to fill a jackpot to be filled jointly from the plurality of coin-operated gambling machines. A filling level of the jackpot is displayed. The filling level of the jackpot is monitored by a communication board of a control circuit of each one of the plurality of gambling machines. A request sequence is sent from one of the communication boards of the control circuits to a mainboard of the control circuits and coordinated to the respective communication board upon reaching or surpassing a jackpot trigger value. An identical game sequence is started at the same time in all linked gambling machines with said request sequence. A gambling result to be expected of a subsequent game is predicted in a final game sequence within a predetermined time period. A rank sequence and a winning quota is determined based on a comparison of the predicted game result and of the actual game result. The rank sequence and the winning quota determine the distribution key for the jackpot.

A quota-corresponding part of the jackpot can be distributed to each user participating in the final game of each one of the plurality of coin-operated gambling machines. The amount received can be determined by the quota obtained on the respective one of the plurality of coin-operated gambling machines operated by the user.

The shared amount of the jackpot can be paid out by a coin-payout unit of the respective one of the plurality of coin-operated gambling machines.

A game sequence can be started in the mainboard by the communication board comprising a qualification game. Participation in a final game can be limited if a winning combination, predetermined in the respective one of the plurality of coin-operating gambling machines, is reached within a predetermined time period in the qualification game. A game sequence can be started in the mainboard by the communication board comprising a final game.

The jackpot amount, branched off in each case proportionately from the gambling bet, can subsequently be fed to a second covered hidden jackpot upon reaching or surpassing a jackpot trigger value. Amounts, not to be paid out of the triggered jackpot, can be added to the hidden jackpot, and the hidden jackpot can now be turned into the triggerable jackpot.

A lower jackpot level value and an upper jackpot level value can be determined by an operating management of a gambling establishment by way of a personal computer through a serial interface of the communication board. A pseudo-random generator of the mainboard can be actuated upon switching on the gambling machines for setting the jackpot trigger value to a level disposed between the lower jackpot level value and the upper jackpot level value. The filling level can be displayed on the plurality of gambling machines or with a large display.

A method is further provided for a determination of a shared jackpot winning of a gambling apparatus unit. A plurality of coin-operated gambling machines are linked to each other. Predetermined data are entered through an interface of a respective communication board with a personal computer. A token is inserted into one of the plurality of coin-operated gambling machines furnished with a communication board and with a mainboard. A predetermined part of a gambling bet of each one of the plurality of coin-operated gambling machines is employed to fill a jackpot to be filled jointly from the plurality of coin-operated gambling machines each furnished with a communication board and with a mainboard. A filling level of the jackpot is displayed on a respective coin-operated gambling machine and/or one large display field. A game sequence is opened in the mainboards by the communication boards if said predetermined data are present for starting an identical game sequence at the same time in each one of the plurality of coin-operated gambling machines. A user predicts a game result of a final game to follow. A winning quota is determined in the final game for each user depending on a comparison of the predicted game results and of the actually achieved game results. The jackpot amount is paid out depending on a respective winning quota.

The predetermined data can be entered by an operating management of the plurality of coin-operated gambling machines as an amount, a date, and a time through the interface of the communication board with a personal computer.

There is further provided a network of gambling machines including a plurality of coin-operated gambling machines, wherein each one of the coin-operated gambling machines includes a display of gaming information, a coin entry unit, a data entry console, a payout unit, a communication board, and a main board. Each communication board comprises a first interface, a memory storage, a central processing unit connected to the interface and connected to the memory storage, and a second interface. A link is furnished connecting the first interface of the plurality of communication boards to each other to form a network. Each mainboard comprises a third interface connected to the second interface of the communication board, a microcomputer connected to the third interface, a fourth interface connected to the microcomputer and adapted to be connected to a data entry terminal, a fifth interface connected to the display of gaming information, the coin entry unit, the data entry console, and to the payout unit. Each mainboard is connected to the respective communication board of a respective one of the plurality of coin-operated gambling machines. A first one of the plurality of coin-operated gambling machines is operated as a master gambling machine, and the remaining ones of the plurality of gambling machines are operated as slave gambling machines for employing a predetermined part of a gambling bet of each one of the plurality of coin-operated gambling machines to fill a jackpot to be filled jointly from the plurality of coin-operated gambling machines, for displaying a filling level of the jackpot, for monitoring the filling level of the jackpot by a communication board of a control circuit of each one of the plurality of gambling machines, for sending a request sequence from one of the communication boards of the control circuits to a mainboard of the control circuits and coordinated to the respective communication board upon reaching or surpassing a jackpot trigger value, and for playing a game by participating machines of the plurality of coin-operated gambling machines for distributing the jackpot among the participating machines.

The jackpot system of the present invention is associated with the advantage that each individual gambling machine connected to the jackpot system can assume the control of the jackpot system. In addition, this game system distinguishes itself in principle from the already existing progressive jackpot link systems, since the collective progressive jackpot amount is not coordinated to a single winner or, respectively, to a single gambling machine, but is played out by several players, entitled to participation, at the respective gambling machines in an especially therefor conceived play-off game, wherein each of the gambling machines, entitled to participation, participates proportionately in the payout of the jackpot amount corresponding to its winning rank sequence. The jackpot play-off is a part of the game system of the gambling machine connected in each case to the jackpot system. The possibility exists now, based on the invention integration of a further control unit in the respective gambling machine, to link gambling machines to each other by means of a communication network without further technical expenditures. In this connection, the additional control unit is constructed such that each control unit can perceive and distinguish the function of a master operation or, respectively, of a slave operation. The determination whether a master operation or a slave operation is present at a particular gaming machine is performed automatically.

The present invention furnishes a jackpot system, where the game allows to win a centrally furnished jackpot. If a predetermined game event is obtained during a qualification phase, then a gambling machine participates in the playout game of the jackpot. Each game machine, participating in the jackpot playout, obtains part of the jackpot depending on the game result obtained in the final game. Thus, it is assured that each participant in the playout of the jackpot wins. This method is particularly adapted to automatic gambling machines comprising a central processing unit (CPU) capable of operating both in a master mode and in a slave mode.

The operation with an automatic switch-over between a master operation and slave operation comprises that the operator of a gambling casino can connect and disconnect gambling machines with different game systems to the network at any point in time. The central processing unit does not require any additional hardware elements in order to be capable to operate both in a master function and in a slave function and thus no additional hardware expenditures are necessary in order to produce the gambling machines of the present invention operating according to the present automatic master-slave switch-over system.

All gambling machines in a network can have the same hardware construction. All gambling machines can contain the same software for performing communications. The software is constructed such as to automatically sense and switch the operation between a master function and a slave function. During the operating of a gambling machine in a master function, this master gambling machine continuously requests the slaves to deliver game results present in an intermediate memory storage, completes the protocol recorded by the master gambling machine and in the following actualizes the slave gambling machines and, for example, furnishes the data required for the jackpot game to the slave gambling machines.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
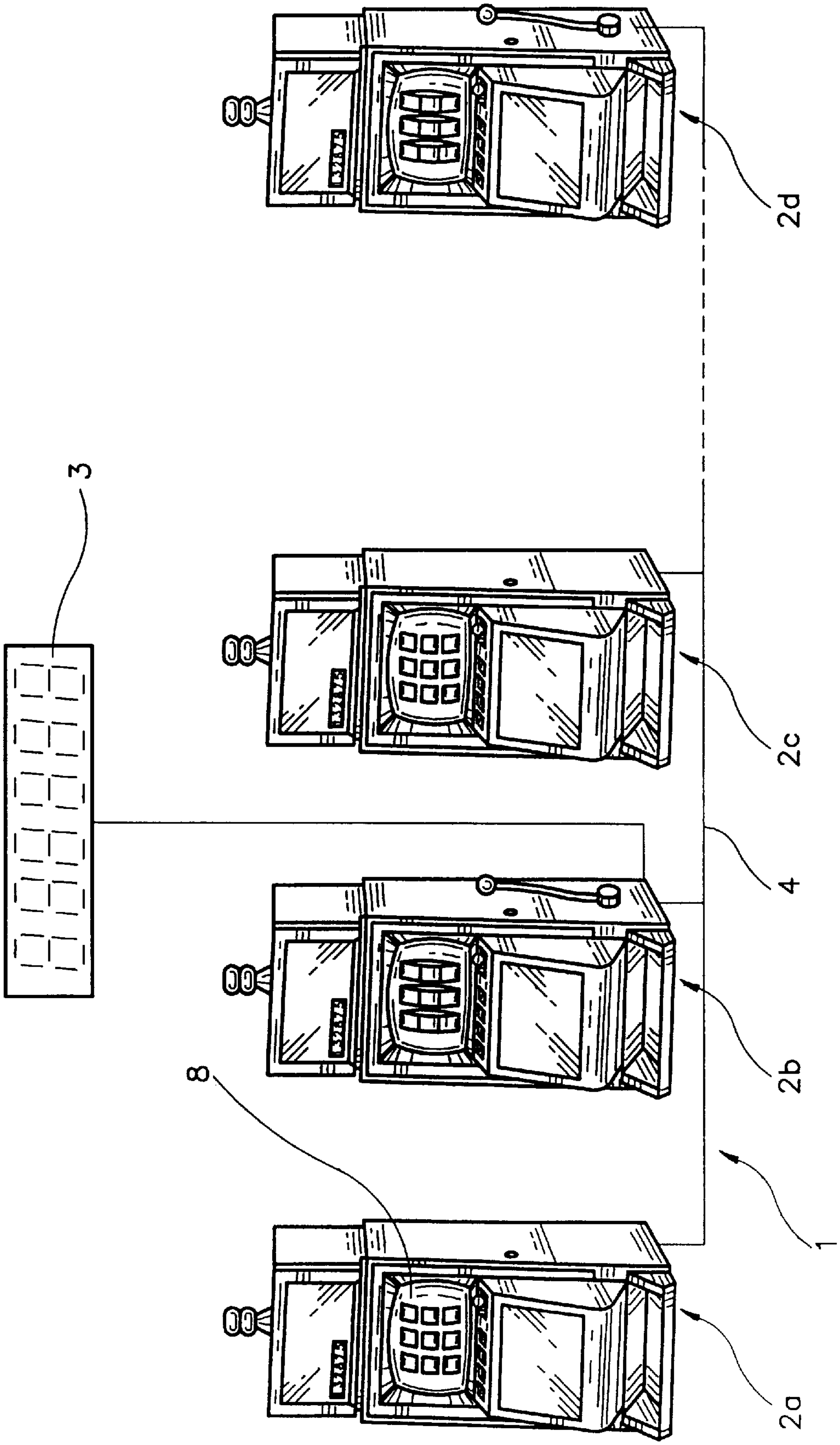
FIG. 1 is a schematic diagram showing the construction in principle of a jackpot system with coin-operated gambling machines with the possibility of money winnings.

A gambling network shown 1, shown in FIG. 1, comprises several coin-operated gambling machines 2*a*–2*d* and a large display field 3, where the momentary level of the jackpot is displayed. The gambling machines 2*a*–2*d* are linked with a network cable system 4 to a communication network. The communication network can comprise 32 or more gambling machines. The gambling machines 2*a*–2*d*, linked in the communication network, can exhibit different gambling systems. According to the present invention, the video displays 8 of the gambling machines can be both of the television monitor type as well as of the mechanical type involving actual rollers or flap card carousels. The display means for the displaying of the winning symbol combinations at the gambling machines 2*a*–2*d* are preferably video screens 8. The gambling machines 2*a* and 2*c* include a video screen 8 for the display of winning symbol combinations, where symbol combinations are illustrated in a 3×3 matrix on the video screen 8. At the same time, the momentary jackpot level is displayed on the respective video screen 8 of the gambling machines 2*b* and 2*d*. Three side-by-side disposed reel-shaped symbol-carrying rotary bodies are in each case displayed on a video screen 8 at the gambling machines 2*b* and 2*d*. The level of the jackpot is also displayed in a designated region of the video screen 8 of the gambling machines 2*b* and 2*d*.

The gambling machines 2*a*–2*d* exhibit in each case a device 12 (FIG. 2) for receiving coins or, respectively, bills on the front side in the region of the video screen 8. The network cable 4, connecting the gambling machines 2*a*–2*d*, is led to plug connections 204 on the gambling machine, where the plug connections 204 are connected on the gambling machines to a control circuit 7 of the respective gambling machines 2*a*–2*d*. The large display field 3 is connected with a plug connection, furnished on the gambling machine, to the control circuit 7 of the gambling machine 2*b*.

Figure 2:
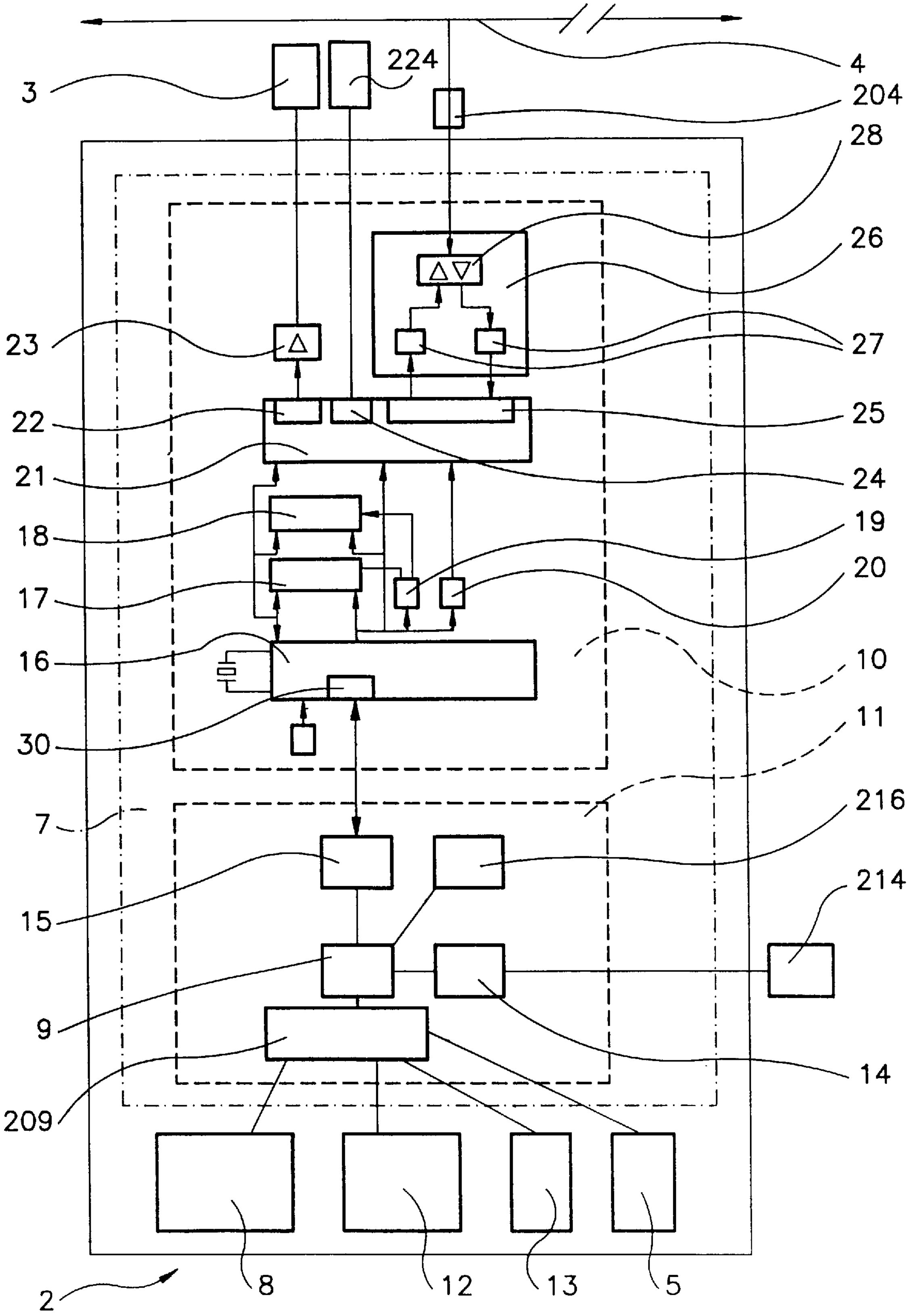
FIG. 2 is a block circuit diagram showing the essential device groups of a coin-operated gambling machine with an additional control device for operating a communication network and an additional display means.
Figure 3:
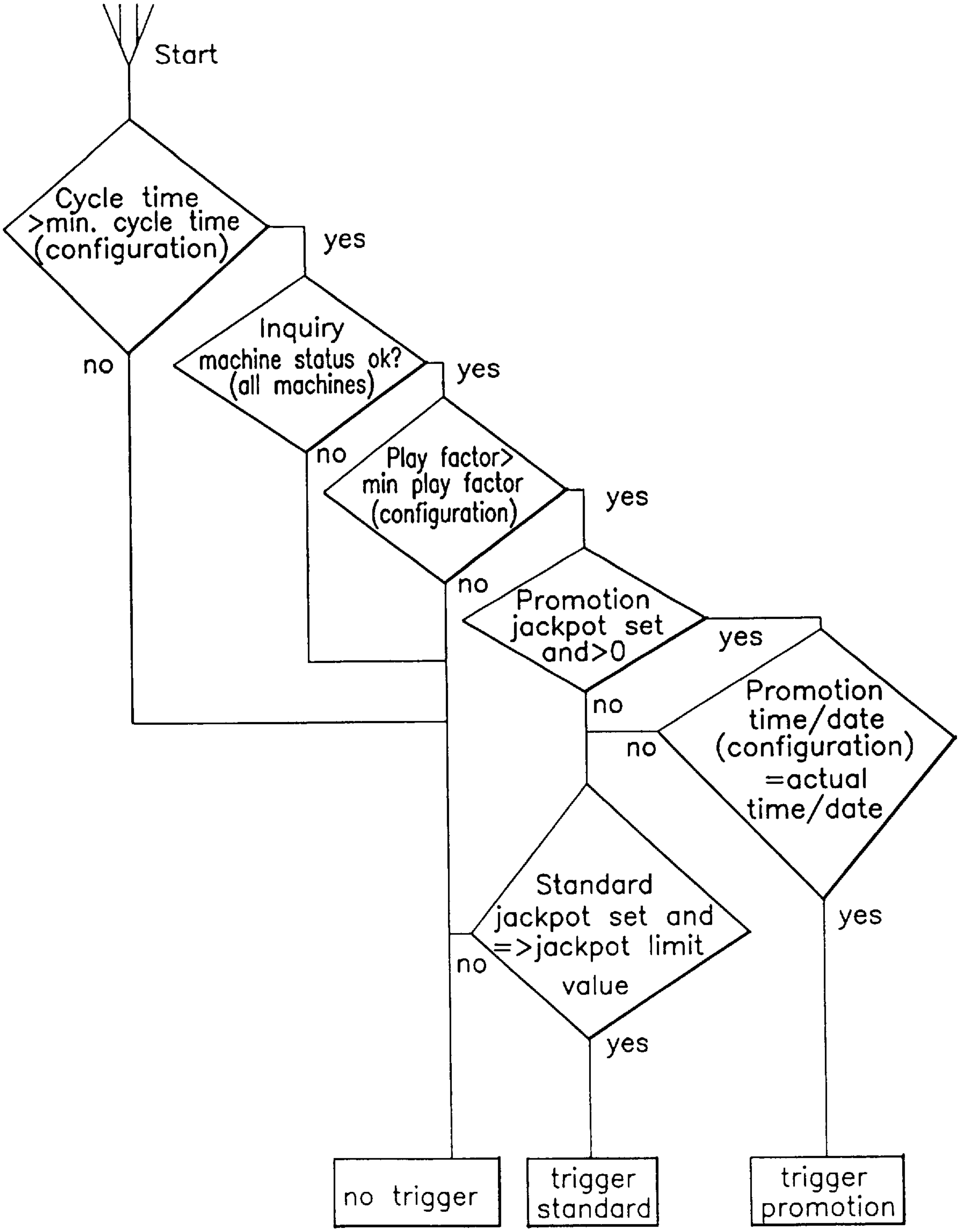
FIG. 3 is a view of a flow diagram showing the triggering of the game cycles at the gambling machines.

The essential device groups, which are required for the operating of a coin-operated gambling machine 2 in the communication network operation, are illustrated in a block circuit diagram in FIG. 2. The gambling machine 2 comprises a symbol display formed as video screen 8. The control circuit 7 comprises in addition to a mainboard 11 also a communication board 10. Display means of a jackpot 3 and a data exchange and data matching of the gambling machines 2*a*–2*d* in the communication network are controlled by the communication board 10. A coin unit 12, as taught in the German printed patent document DE 36 41 346 A1, comprises an electronic coin tester, a coin separating unit following to the electronic coin tester, and followed by coin stack tubes for the individual coins, wherein the coin stack tubes exhibit on the end side an electromagnetically actuatable payout unit 5, as well as operating elements 13, which are connected through an interface 209 to the microcomputer 9 of the mainboard 11. The microcomputer 9 of the mainboard 11 comprises a microprocessor, such as CPU Hitachi 64 180 or Zilog Z80 180, 8 bit, 12 MHz, with an arithmetic-logic unit, an accumulator, and a control unit with fixed-value memory storage (ROM 27C 1000 / 2000 / 4000) and operating data memory storage (DS 1386 with a battery backup RAM), a clock-cycle generator as well as a bus system, with which all units are supplied with data addresses and memory addresses as well as control signals, and an input/output unit 209 for performing the data traffic with the peripheral devices, such as the video screen 8, the coin unit 12, or the operating elements 13.

Furthermore, the microcomputer 9 connects through serial interfaces 14, 15 disposed on the main board 11. A connection to the communication board 10 on the gambling machine is furnished with the serial interface 15 (TTL-level). The serial interface 14 is formed as an RS 232 interface.

The communication board 10 comprises its own central processing unit CPU 16 (Hitachi 64 180 or Zilog Z80 180) with a serial interface 30 on the side of the CPU. A fixed-value memory storage (ROM) 17 of the type 27C 1000 /2000 and a battery-buffered production data memory storage (RAM) 18 of the type DS 1225/1230Y is coordinated to the central processing unit 16. The connection between the central processing unit 16, the memory storage components 17, 18, and a serial communication controller 21 (Zilog Z 85 C 30) with serial ports is performed by an address decoder 19 and an input/output I/O decoder 20 and by a bus system. A serial port 22 of the communication controller 21 leads to the large display field 3 through the intermediary of a power amplifier 23 (MAX 483 or MAX 487), where the momentary jackpot level is displayed on the large display field 3. The connection between the master gaming machine 2*b* to the large display field 3 is implemented, whereas the slave gaming machines 2*a*, 2*c*, and 2*d* are not connected to such a large display field 3. An external personal computer 224 can be connected at an interface 24 of the communication controller 21, where the interface 24 is formed as a serial type RS 232. An interface converter 26 is connected at an interface 25 of the communication controller 21, where the interface 25 is formed as a serial type RS 485. The interface converter 26 comprises essentially an optical coupler 27 of the type 6 N 136 for the galvanic separation and following thereto a power amplifier 28. The network cabling is connected to the power amplifier 28.

The connection of the gambling machines 2*a*–2*d* and the communication of the gambling machines with each other is performed through the respective communication board 10. Each communication board 10 has an individual address number, which is set once with a rotary switch. After each of the gambling machines has been switched on, there occurs the automatic recognition as to which one of the gambling machines 2*a*–2*d* performs the master function or the slave function. This automatic recognition of the master gambling machine 2*b* can be associated with a sensing of a connection between the control circuit 7 of the respective gambling machine 2*b* and the large display field 3. After a switching on, the gambling machines wait for a time period of three seconds+(50 milliseconds×individual address number) for a recognition signal of the master. Since no gambling machine 2*a*–2*d* has yet accepted the master function at this point in time, the acknowledgement signal is not present. In this case, a master-function takeover signal is sent after a further two seconds by the communication board. According to the above-recited time calculation, the gambling machine with the lowest address number will send out this signal first and take over the master function. The other communication boards 10 will confirm the receipt of this signal and will behave as slaves in the communication network.

The data are updated over the communication network every (30 milliseconds×number of gambling machines in the communication network), i.e. the master 2*b* requests the data from each individual slave 2*a*, 2*c*, 2*d*, adds up the total amount, and returns the data back to the slaves 2*a*, 2*c*, 2*d* such that each communication board 10 contains the same data content. Therefore, each slave 2*a*, 2*c*, 2*d* can assume the master function in case of a malfunction of the master 2*b*. Such a network is associated with the advantage of multi-master capability. Each communication board 10 contains its own central processing unit 16 with the communication software installed and all data relevant for the control of the network, and can therefore assume both the function of the master as well as the function of a slave according to its designation. This measure assures that also in case of a failure of the master 2*b* the valid data content and the overall functioning of the system remains intact at all times with the exception of the original master 2*b*.

If upon a switching on of the gambling machines 2*a*–2*d* there should be indications of more than a single master, and there is a possibility that one master receives the master signal of another master, then the master with the lowest address number will deactivate and will perform the slave function. Alternatively, a sensing of a connection to the large display field 3 can be performed in each gambling machine. When no large display field 3 is present or when the gambling machine connected to the large display field After a successful automatic master/slave determination, in each case after the switching on of the gambling machines 2*a*–2*d*, the communication board 10 furnishes a release signal to the mainboard 11. A configuration can be performed with a personal computer PC 214 through an interface 14 and, in particular, a serial interface, disposed on the mainboard 11 and formed as a RS 232 series interface 14, as to what percentage of the respective gambling bet is branched off to the jackpot. The filling level of the jackpot is displayed on the video screen 8 on the one hand, and on a central large-display field 3 on the other hand.

Furthermore, a second, covered, so-called hidden jackpot is furnished. This covered or second progressive jackpot, not visible to the player, accumulates in the background. The increase or, respectively, the growth of the second covered, hidden jackpot can be set by the operating management. The operating management determines the percentage which is branched off from the game bet for the hidden jackpot. If the first jackpot is only in part paid out, then the remaining amount of the first jackpot is used to fill the hidden jackpot and this hidden jackpot becomes subsequently the first jackpot, where the first jackpot is thus displayed on the respective display 8 at the gambling machine and/or on the large display field 3. Thus, the hidden jackpot is built up by way of an adjustable and settable percentage and simultaneously with the first jackpot.

A jackpot trigger value is predetermined by a determination of a lower jackpot value and of an upper jackpot value. The jackpot trigger value disposed between the lower and the upper jackpot value is determined with a pseudo-random generator 216 of the mainboard 11. Upon reaching or surpassing of the jackpot trigger value, the jackpot is frozen and a jackpot payout sequence is started. If the jackpot limiting value is surpassed by the proportional branching off of from the further bets of the game, then the amount surpassing the jackpot trigger value is fed to the hidden jackpot. Thus, subsequently, the jackpot amount, branched off in each case proportionately from the gambling bet, is fed to a second covered hidden jackpot upon reaching or surpassing, i.e. experiencing a jackpot trigger value.

The gambling machine 2*a*–2*d* with the master function calls every 30 milliseconds for the data of each one of the individual slaves and thus receives the increased amount of the jackpot. These part values are added up by the master 2*b*, the actual jackpot value is calculated and is transmitted through the communication network to the slaves. If a reaching or a surpassing of the jackpot trigger value is thereby determined, then a special jackpot payout sequence is activated by the mainboard 11, which is the same type main board with all gambling machines 2*a*–2*d*.

If the jackpot payout sequence was initiated, then at each of the gambling machines 2*a*–2*d*, which are part of the network, the possibility is given to each user of the gambling machine 2*a*–2*d* to obtain in a so-called qualification time a predetermined result within a predetermined time interval, displayable with the video screen 8, i.e. the user has to reach a winning symbol combination predetermined in the gambling machine within an arbitrary number of games during this time period. The way and means of qualification are determined by the game software employed.

A percentagewise predetermined part of the gambling stakes or bets during the qualification time is added to the second, so-called hidden jackpot. The time duration or, respectively, the remaining qualification time is graphically illustrated on the video screen 8. The players or the users of the gambling machines 2*a*–2*d*, which have reached the predetermined gambling result within the qualification time, can now participate in a final game, which is in this example a horse-racing game. The number of the horses participating in the race depends on the number of the participating gambling machine users. The following standard values and determining factors are valid for representing the number of horses on the video screen:

Number of horses: (minimum number: 3 horses)
Number of qualified participants ≦5: 3 horses
Number of qualified participants 6–7: 4 horses
Number of qualified participants ≧8: 5 horses.

The possibility is now given to the qualified user of the gambling machine 2*a*–2*d* to put a bet on an occurrence of a game result during a further, subsequently following predetermined time period. This is performed by activation of operating elements disposed on the front side of the gambling machine 2*a*–2*d*, which operating elements are connected to the control circuit 7 of the respective gambling machine 2*a*–2*d*. The remaining betting time is also graphically illustrated on the video screen. Furthermore, the winning quotas or, respectively, the possible win amount of the jackpot are displayed to each player. If several players have bet on the same game result or horse, then the winning quota is calculated anew corresponding to this number of players and is displayed on the video screen 8. The following standard is used for the calculation of the winning quota:

Winning quota per placement:

Horse races with

| | Percentage of the jackpot value | | |
|---|---|---|---|
| | 5 horses | 4 horses | 3 horses |
| first place | 50% | 52% | 55% |
| second place | 20% | 21% | 25% |
| third place | 15% | 16% | 20% |
| fourth place | 10% | 11% | |
| fifth place | 5% | | |

Several factor tables are stored in the fixed-value memory storage of the main board.

The indicated percentage values are varied by means of a factor table on the main board in order that each payout is not based on the same percentage.

Type of winning table at the video screen:

| | Place 1 | Place 2 | Place 3 | Place 4 | Place n |
|---|---|---|---|---|---|
| Horse 1 | | | | | |
| Horse 2 | | | | | |
| Horse 3 | | | | | |
| Horse 4 | | | | | |
| Horse n | | | | | |

From the existing factor table disposed on the communication board 10 there is selected one of these per pseudorandom number generator of the mainboard 11. The following holds for all factors entered in the factor table:

(factor place 1+factor place 2+ . . . + factor place n)/n=1;

where n=number of horses.

Calculation of the individual winnings amounts:

winning place n=jackpot amount×winning quota×factor place n;

where n is the number of the horses.

Non-qualified players or, respectively, gambling machines 2*a*–2*d* do not have a possibility to participate in the betting procedure in the final game. After expiration of the betting time, the final game (horse race) is activated simultaneously in all participating gambling machines 2*a*–2*d*. It is determined in the final game which of the players has correctly played the displayed game result. The jackpot is paid out according to the determined rank sequence and winning quota. Amounts that are not paid out are fed into the hidden jackpot, which then serves as starting amount for the new jackpot. This final game (horse race) is a second, independent game, which runs its course simultaneously and identically in all gambling machines 2*a*–2*d* through the communication network and which is integrated as a part in the gambling software of each one of the gambling machines 2*a*–2*d*.

According to a further embodiment of the invention, the initially described qualification time is dispensed with. The qualification time can be deactivated by means of a personal computer connected to the serial interface 14 by the operating management, i.e. in this case the users of the gambling machines 2*a*–2*d* do not have to reach a winning symbol combination predetermined by the gambling machine in order to participate in the final game. Thus, everyone can participate in the final game.

According to a further embodiment of the invention, the initially described determination of the jackpot trigger value is dispensed with. Instead of the jackpot trigger value, alternatively, a "promotion" jackpot can be activated within the system, i.e. an amount and a date/time of day is entered through the serial interface 14. By way of an actual-time clock present on the mainboard 11, the final game is initiated with the entered amount at exactly the predetermined point in time.

It will be understood that each of the elements described above, or two or more together, may also find a useful application in other types of methods for determining jackpot winnings differing from the types described above.

While the invention has been illustrated and described as embodied in the context of a method for determination of a shared jackpot winning, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for a determination of a shared jackpot winning of a plurality of coin-operated gambling machines comprising the steps:

linking a plurality of coin-operated gambling machines to each other;

entering a distribution key for distributing a jackpot into one of the plurality of coin-operated gambling machines;

inserting a token into one of the plurality of coin-operated gambling machines;

employing a predetermined part of a gambling bet of each one of the plurality of coin-operated gambling machines to fill a jackpot to be filled jointly from the plurality of coin-operated gambling machines;

displaying a filling level of the jackpot;

monitoring the filling level of the jackpot by a communication board of a control circuit of each one of the plurality of gambling machines;

sending a request sequence from one of the communication boards of the control circuits to a mainboard of the control circuits and coordinated to the respective communication board upon reaching or surpassing a jackpot trigger value;

starting an identical game sequence at the same time in all linked gambling machines with said request sequence;

predicting a gambling result to be expected of a subsequent game in a final game sequence within a predetermined time period;

determining a rank sequence and a winning quota based on a comparison of the predicted game result and of the actual game result, wherein the rank sequence and the winning quota represent the distribution key for the jackpot.

2. The method according to claim 1, further comprising distributing a quota-corresponding part of the jackpot to each user participating in the final game of each one of the plurality of coin-operated gambling machines, wherein the amount received is determined by the quota obtained on the respective one of the plurality of coin-operated gambling machines operated by the user.

3. The method according to claim 1, further comprising paying out the shared amount of the jackpot by a coin-payout unit of the respective one of the plurality of coin-operated gambling machines.

4. The method according to claim 1, further comprising starting a game sequence in the mainboard by the communication board comprising a qualification game;

limiting participation in a final game if a winning combination, predetermined in the respective one of the plurality of coin-operating gambling machines, is reached within a predetermined time period in the qualification game;

starting a game sequence in the mainboard by the communication board comprising a final game.

5. The method according to claim 1, further comprising subsequently feeding the jackpot amount, branched off in each case proportionately from the gambling bet, to a second covered hidden jackpot upon experiencing a jackpot trigger value.

6. The method according to claim 5, further comprising adding amounts, not to be paid out of the triggered jackpot, to the hidden jackpot, and now turning the hidden jackpot into the triggerable jackpot.

7. The method according to claim 1, further comprising predetermining a lower jackpot level value and an upper jackpot level value by an operating management of a gambling establishment by way of a personal computer through a serial interface of the communication board; and actuating a pseudo-random generator of the mainboard upon switching on the gambling machines for setting the jackpot trigger value to a level disposed between the lower jackpot level value and the upper jackpot level value.

8. The method according to claim 1, further comprising displaying the filling level on the plurality of gambling machines.

9. The method according to claim 1, further comprising displaying the filling level with a large display.

10. A method for the determination of a shared jackpot winning of a gambling apparatus unit comprising the steps:

linking a plurality of coin-operated gambling machines to each other;

entering predetermined data through an interface of a respective communication board with a personal computer;

inserting a token into one of the plurality of coin-operated gambling machines furnished with a communication board and with a mainboard;

employing a predetermined part of a gambling bet of each one of the plurality of coin-operated gambling machines to fill a jackpot to be filled jointly from the plurality of coin-operated gambling machines each furnished with a communication board and with a mainboard;

displaying a filling level of the jackpot;

opening a game sequence in the mainboards by the communication boards if said predetermined data are present for starting an identical game sequence at the same time in each one of the plurality of coin-operated gambling machines;

user predicting a game result of a final game to follow;

determining a winning quota in the final game for each user depending on a comparison of the predicted game results and of the actually achieved game results; and paying out the jackpot amount depending on a respective winning quota.

11. The method for the determination of a shared jackpot winning according to claim 10, further comprising the step:

entering the predetermined data by an operating management of the plurality of coin-operated gambling machines as an amount, a date, and a time through the interface of the communication board with a personal computer.

12. A network of gambling machines, comprising a plurality of coin-operated gambling machines, each one of the coin-operated gambling machines including:

a display of gaming information;

a coin entry unit;

a data entry console;

a payout unit;

a communication board, wherein each communication board comprises a first interface, a memory storage, a central processing unit connected to the interface and connected to the memory storage, and a second interface, wherein a link is furnished connecting the first interface of the plurality of communication boards to each other to form a network;

a mainboard, wherein each mainboard comprises a third interface connected to the second interface of the communication board, a microcomputer connected to the third interface, a fourth interface connected to the microcomputer and adapted to be connected to a data entry terminal, a fifth interface connected to the display of gaming information, the coin entry unit, the data entry console, and to the payout unit, wherein each mainboard is connected to the respective communication board of a respective one of the plurality of coin-operated gambling machines; and wherein a first one of the plurality of coin-operated gambling machines is operated as a master gambling machine, and wherein the remaining ones of the plurality of gambling machines are operated as slave gambling machines for employing a predetermined part of a gambling bet of each one of the plurality of coin-operated gambling machines to fill a jackpot to be filled jointly from the plurality of coin-operated gambling machines, for displaying a filling level of the jackpot, for monitoring the filling level of the jackpot by a communication board of a control circuit of each one of the plurality of gambling machines, for sending a request sequence from one of the communication boards of the control circuits to a mainboard of the control circuits and coordinated to the respective communication board upon reaching or surpassing a jackpot trigger value, and for playing a game by participating machines of the plurality of coin-operated gambling machines for distributing the jackpot among the participating machines.

13. A method for the determination of a shared jackpot winning of a gambling apparatus unit, where the gambling apparatus unit comprises coin-operated gambling machines, linking the gambling machines to each other, jointly filling a jackpot by the gambling machines, employing a predetermined part of the gambling bet of each gambling machine to fill the jackpot, displaying the filling level of the jackpot on the gambling machine and with a large display, monitoring the filling level of the jackpot is a communication board (10) of a control circuit (7) of the gambling machines (2*a*–2*d*), sending an order sequence from the communication board (10) to a main board (11) of the control circuit (7) upon reaching or surpassing a jackpot trigger value, using the order sequence to start an identical game sequence at the same time in all linked gambling machines (2*a*–2*d*), predicting a gambling result to be expected of a subsequent game in this final game sequence with a predetermined time period, determining a rank sequence and a winning quota depending on the predicted game result and the actual game result, and employing the rank sequence and the winning quota as a distribution key for the jackpot.

14. The method according to claim 13, wherein the user of each gambling machine (2*a*–2*d*), who participated in the final game, receives a quota-corresponding part of the jackpot according to the quota obtained on his gambling machine or her gambling machine.

15. The method according to claim 13 further comprising paying out the shared amount of the jackpot by the coin-payout unit of the gambling machine.

16. The method according to claim 13, wherein the game sequence, started in the mainboard (11) by the communication board (10), comprises a qualification game and the final game, and wherein participation is available in the final game if a winning combination or winning combinations, predetermined in the gambling machine, are reached within a predetermined time period in the qualification game.

17. The method according to claim 13, wherein upon reaching or surpassing the jackpot trigger value, the jackpot amount, branched off proportionately from the gambling bet, is subsequently fed to a second covered hidden jackpot.

18. The method according to claim 17, wherein the amounts not to be paid out of the triggered jackpot are added to the hidden jackpot, and wherein the hidden jackpot now becomes the triggerable jackpot.

19. The method according to claim 13, wherein a lower jackpot level value and an upper jackpot level value can be predetermined by the operating management of the gambling establishment by way of a personal computer through a serial interface (24) of the communication board (10), and wherein the jackpot trigger value between the lower jackpot level value and the upper jackpot level value is determined by way of a pseudo-random generator (216) of the mainboard (11) upon switching on the gambling machines (2*a*–2*d*).

20. A method for the determination of a shared jackpot winning of a gambling apparatus unit, wherein the gambling apparatus unit comprises coin-operated gambling machines comprising linking gambling machines to each others;

jointly filling a jackpot by the linked gambling machines;

employing a predetermined part of the gambling bet of each gambling machine to fill the jackpot;

displaying the filling level of the jackpot on the gambling machine and with a large display, wherein an operating management of the gambling apparatus units can determine an amount, a date, and a time through an interface (24) of the communication board (10) with a personal computer and, if these set data are present, then a game sequence is opened in the mainboards (11) by the communication boards (10), whereby an identical game sequence is started at the same time in all network gambling machines, wherein the user of the gambling machine (2*a*–2*d*) has to predetermine a game result of a following final game, and wherein a winning quota is determined in the final game for each participant depending on the predicted and the actually achieved game results, and wherein the jackpot amount is paid out depending on the respective winning quota.

* * * * *

UNITED STATES PATENT AND TRADEMARK OFFICE

CERTIFICATE OF CORRECTION

PATENT NO : 6,089,980

DATED : July 18, 2000

INVENTOR(S) : Michael Gauselmann

It is certified that error appears in the above-identified patent and that said Letters Patent are hereby corrected as shown below:

Title page: item (75) inventor:

delete "Wohnsitz", and insert -- Espelkamp --

Signed and Sealed this

Seventeenth Day of April, 2001

Attest:

Nicholas P. Godici

NICHOLAS P. GODICI

*Attesting Officer*

*Acting Director of the United States Patent and Trademark Office*